(12) United States Patent
Verbulskii et al.

(10) Patent No.: US 11,503,494 B2
(45) Date of Patent: Nov. 15, 2022

(54) OPTIMIZING CELL OUTAGE MITIGATION IN A COMMUNICATIONS NETWORK

(71) Applicant: Telefonaktiebolaget LM Ericsson (publ), Stockholm (SE)

(72) Inventors: Vladimir Verbulskii, County Westmeath (IE); Rodrigo Correia, County Westmeath (IE); Gary Sturgeon, County Westmeath (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 261 days.

(21) Appl. No.: 16/633,681

(22) PCT Filed: Aug. 1, 2017

(86) PCT No.: PCT/EP2017/069413
§ 371 (c)(1),
(2) Date: Jan. 24, 2020

(87) PCT Pub. No.: WO2019/024987
PCT Pub. Date: Feb. 7, 2019

(65) Prior Publication Data
US 2021/0368380 A1 Nov. 25, 2021

(51) Int. Cl.
*H04W 28/02* (2009.01)
*H04W 36/30* (2009.01)
*H04W 24/04* (2009.01)

(52) U.S. Cl.
CPC ... *H04W 28/0236* (2013.01); *H04W 28/0247* (2013.01); *H04W 36/305* (2018.08); *H04W 24/04* (2013.01)

(58) Field of Classification Search
CPC ......... H04W 28/0236; H04W 28/0247; H04W 36/305; H04W 24/04
See application file for complete search history.

(56) References Cited

U.S. PATENT DOCUMENTS

| 7,383,191 B1 | 6/2008 | Herring et al. | |
| 2013/0051239 A1* | 2/2013 | Meredith | H04W 16/18 370/241 |

(Continued)

FOREIGN PATENT DOCUMENTS

| EP | 3 209 052 A1 | 8/2017 |
| RU | 2015 153 549 A | 6/2017 |

(Continued)

OTHER PUBLICATIONS

3GPP TS 32.104 v4.0.0; Technical Specification; 3rd Generation Partnership Project; Technical Specification Group Services and System Aspects; Telecommunication Management; 3G Performance Management (PM) (Release 4)—Mar. 2001.

(Continued)

*Primary Examiner* — Peter P Chau
(74) *Attorney, Agent, or Firm* — Baker Botts, LLP

(57) ABSTRACT

Methods and apparatus are provided for optimising mitigation of an outage of a cell in a communications network. In one aspect, a method comprises determining an outage of the cell during a first time period. A time-variable parameter is determined that is indicative of predicted impact of the outage of the cell, the impact being predicted based on historical data for the cell in at least one earlier time period. One or more actions are performed in relation to the outage based on the time-variable parameter for said first time period.

18 Claims, 5 Drawing Sheets

(56) References Cited

U.S. PATENT DOCUMENTS

| | | | |
|---|---|---|---|
| 2013/0288681 A1 | 10/2013 | Hamalainen et al. | |
| 2014/0073303 A1* | 3/2014 | Henderson | H04W 16/00 455/418 |
| 2015/0304981 A1 | 10/2015 | Peng et al. | |
| 2017/0317873 A1* | 11/2017 | Hévizi et al. | H04W 24/04 |
| 2017/0353873 A1* | 12/2017 | Aksela | H04L 41/12 |
| 2018/0124097 A1* | 5/2018 | Tiwari | H04L 63/1425 |

FOREIGN PATENT DOCUMENTS

| | | |
|---|---|---|
| RU | 2 628 531 C2 | 8/2017 |
| WO | 97 24839 A2 | 7/1997 |

OTHER PUBLICATIONS

3GPP TS 32.421 v14.0.0; Technical Specification; 3rd Generation Partnership Project; Technical Specification Group Services and System Aspects; Telecommunication management; Subscriber and equipment trace; Trace concepts and requirements (Release 14)—Apr. 2017.

3GPP TS 32.500 v14.0.0; Technical Specification; 3rd Generation Partnership Project; Technical Specification Group Service and System Aspects; Telecommunication Management; Self-Organizing Networks (SON); Concepts and Yequirements (Release 14)—Apr. 2017.

3GPP TS 32.600 v14.0.0; Technical Specification; 3rd Generation Partnership Project; Technical Specification Group Services and System Aspects; Telecommunication management; Configuration Management (CM); Concept and high-level requirements (Release 14)—Apr. 2017.

3GPP TS 32.111-1 v14.0.0; Technical Specification; 3rd Generation Partnership Project; Technical Specification Group Services and System Aspects; Telecommunication management; Fault Management; Part 1: 3G fault management requirements (Release 14)—Mar. 2017.

PCT International Search Report for International application No. PCT/EP2017/069413—Dec. 1, 2017.

PCT Written Opinion of the International Searching Authority for International application No. PCT/EP2017/069413—dated Dec. 1, 2017.

Communication Pursuant to Article 94(3) EPC issued for Application No. 17 751 688.7-1212—dated Jun. 9, 2021.

* cited by examiner

400

500

OPTIMIZING CELL OUTAGE MITIGATION IN A COMMUNICATIONS NETWORK

PRIORITY

This nonprovisional application is a U.S. National Stage Filing under 35 § 371 of International Patent Application Serial No. PCT/EP2017/069413 filed Aug. 1, 2017 and entitled "OPTIMIZING CELL OUTAGE MITIGATION IN A COMMUNICATIONS NETWORK" which is hereby incorporated by reference in its entirety.

TECHNICAL FIELD

Examples of the present disclosure relate to optimizing mitigation of an outage of a cell in a communications network.

BACKGROUND

As demand for data in mobile or cellular communications networks increases, there is a desire to obtain the highest throughput for end users and an always-on service. Therefore, any service outages must be mitigated and quickly resolved.

Some networks may be configured as Self-Organizing Networks (SON) that may achieve operational and capital expenditure reductions using self-configuring, self-optimizing and self-healing functionality. Self-healing may include detection and potential resolution of cell outages. One part of this is Cell Outage Compensation (COC), which deals with mitigating or alleviating performance degradation due to outages. Typically, this can involve cell restarts, or repair actions (such as tilt or power modification) to increase the coverage of other cells in order to cover the outage area.

Resolution of the cause of the outage is another area which can be time consuming and costly. Resolution typically involves data analysis, planning, scheduling and, for many outages, on-site maintenance.

SUMMARY

One aspect of the present disclosure provides a method of optimising mitigation of an outage of a cell in a communications network. The method comprises determining an outage of the cell during a first time period. A time-variable parameter is determined that is indicative of predicted impact of the outage of the cell, the impact being predicted based on historical data for the cell in at least one earlier time period. One or more actions are performed in relation to the outage based on the time-variable parameter for said first time period.

Another aspect of the present disclosure provides apparatus for optimising mitigation of an outage of a cell in a communications network. The apparatus comprises a processor and a memory, and the memory contains instructions executable by the processor such that the apparatus is operable to determine an outage of the cell during a first time period and determine a time-variable parameter indicative of predicted impact of the outage of the cell. The impact being predicted based on historical data for the cell in at least one earlier time period. The apparatus is operable to perform one or more actions in relation to the outage based on the time-variable parameter for said first time period.

A further aspect of the present disclosure provides apparatus for optimising mitigation of an outage of a cell in a communications network. The apparatus comprises a determining module for determining an outage of the cell during a first time period. The apparatus also comprises a prediction module for determining a time-variable parameter indicative of predicted impact of the outage of the cell, the impact being predicted based on historical data for the cell in at least one earlier time period, and a performing module for performing one or more actions in relation to the outage based on the time-variable parameter for said first time period.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, application specific integrated circuit, ASICs, programmable logic arrays, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
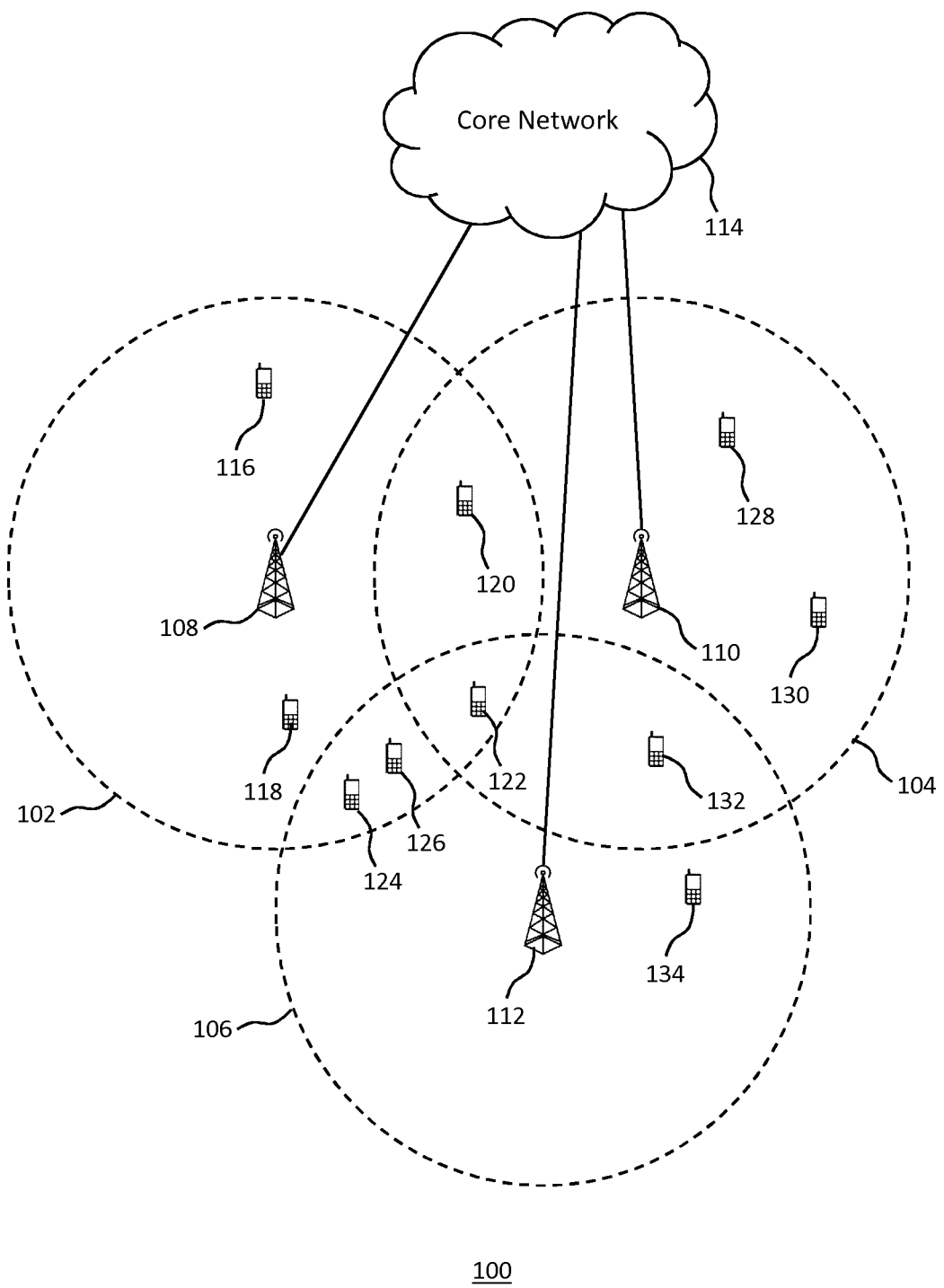
FIG. 1 is a schematic illustration of an example of a communications network.

FIG. 1 shows an example of a communications network 100. The communications network includes a number of cells 102, 104 and 106, each served by base stations (such as for example eNodeBs) 108, 110 and 112 respectively. The base stations may be connected to a core network 114.

The network 100 serves a number of mobile devices. For example, cell 102 may serve mobile devices 116, 118, 120, 122, 124 and 126. That is, these mobile devices are within the coverage area of the cell 102, and these mobile devices communicate wirelessly with the base station 108 associated with the cell 102. Similarly, cell 104 serves mobile devices 128, 130 and 132, and cell 106 serves mobile device 134. Some mobile devices served by one cell may be within the coverage area of another cell. For example, mobile devices 120 and 122 served by cell 102 may be within the coverage area of cell 104, mobile devices 122, 124 and 126 served by cell 102 may be within the coverage area of cell 106, and mobile device 132 served by cell 104 may be within the coverage area of cell 106. Therefore, these mobile devices may each have one or more suitable alternative serving cells. For example, mobile device 120 is served by cell 102, but the cell 104 may be a suitable alternative serving cell for the device 120 because in the event of an outage of the cell 102, whereby the cell 102 can no longer serve mobile devices, the cell 104 may serve the device 120 instead.

Figure 2:
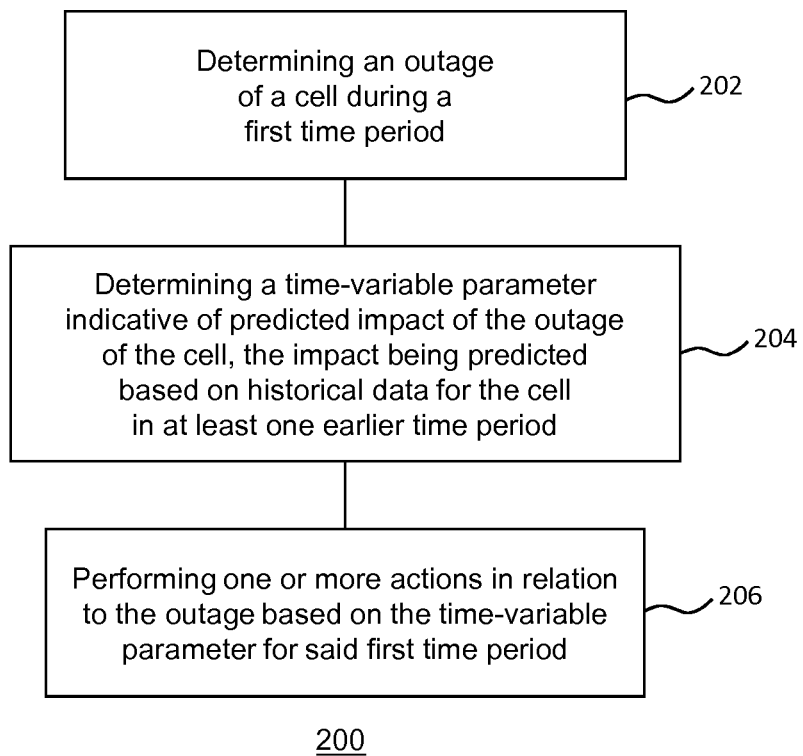
FIG. 2 is a flow chart of an example of a method of optimizing cell outage mitigation.

FIG. 2 shows an example of a flow chart of a method 200 of optimising mitigation of an outage of a cell in a communications network, such as for example the communications network 100 of FIG. 1. In some examples, the method 100 may be implemented by a network node, such as a base station, a node in the core network, or any other suitable node. The method 200 comprises, in step 202, determining an outage of the cell during a first time period. For example, it is determined that the cell will offer no functionality or reduced functionality during the first time period.

In some examples, determining the outage may comprise detecting a current outage of the cell. Detecting a current outage of the cell may in some examples include analysing data pertaining to the cell and/or mobile devices served by the cell. In some examples, the data may include Configuration Management (CM) data as defined by 3GPP TS32.600, Fault Management (FM) data as defined by 3GPP TS32.111-1, Performance Management (PM) Data is specified in 3GPP TS 32.104 and/or Subscriber and Equipment Trace data is defined in 3GPP TS 32.421. Data gathered according to one or more of these categories may indicate a current outage of one or more cells in a communications network. However, these are merely examples and any suitable method for detecting a cell outage may be used.

In some examples, the first time period may be a future time period. As such, determining the outage may comprise predicting a future outage during the first time period. Any suitable method for predicting a cell outage may be used. One example comprises predicting operational lifetime of a node in a communication network, as discussed in PCT application no. PCT/EP2014/061461 entitled "Operational Lifetime of Communication Network Nodes."

After the cell outage during the first time period is determined, the method 200 comprises determining, in step 204, a time-variable parameter indicative of predicted impact of the outage of the cell, the impact being predicted based on historical data for the cell in at least one earlier time period. The time-variable parameter may be a value that indicates the impact, severity or significance of the outage at particular points in time. For example, if a large number of users is affected, the impact of the outage of the cell may be more severe, and therefore the time-variable parameter may indicate a higher impact than if fewer users are affected. As the predicted impact is based on historical data, the impact of the outage for the first time period can be predicted.

In step 206 of the method 200, one or more actions are performed in relation to the outage based on the time-variable parameter for said first time period. The actions may comprise actions to mitigate or repair the cell outage, and may in some examples be performed at particular times during the first time period. The actions may also comprise taking no action.

Illustrative examples of determining the time-variable parameter will now be described. In an example, data from mobile devices may be used to determine the time-variable parameter. In particular, each mobile device served by a cell may report (for example to the base station for that cell or to another network node) radio measurements relating to the serving cell, as well as radio measurements for neighbouring cells. This measurement data can include, for example, Reference Signal Received Power (RSRP) and Reference Signal Received Quality (RSRQ) of the serving cell together with reported measurements of neighbours. The measurement data may therefore indicate whether a mobile device has a suitable alternative serving cell. For example, a mobile device may be served by a serving cell, and report measurements from one or more neighbour cells. However, measurement data from the mobile device may indicate that a neighbour cell is a suitable serving cell, such as for example the measurement data indicating that the RSRP or RSRQ for the neighbour cell is above a threshold value. The measurement data may indicate that the mobile device has more than one suitable alternative serving cell, or no suitable alternative serving cell. Reports from a mobile device that contain measurement data may be sent periodically, and/or sent in response to a request for measurement data from the mobile device.

The historical data may be based on past measurement reports from devices served by a cell. As such, the historical data may be cell-specific. In one example, the historical data may indicate the number of devices that were served by the cell in at least one earlier time period that did not have a suitable alternative serving cell, or the proportion of all devices served by the cell that did not have a suitable alternative serving cell. If the serving cell were to experience an outage, these devices would not have a suitable alternative serving cell (in the absence of any mitigating actions) and therefore may experience loss of service. Therefore, the impact of an outage of the cell may be higher with a higher number or proportion of such devices. Other devices that indicate at least one suitable alternative serving cell may be assumed to be able to migrate to another serving cell during an outage, though if any of the suitable alternative serving cells are also experiencing an outage during the first time period, this may be taken into account (for example, by disregarding any cells experiencing an outage that were earlier indicated as being suitable alternative serving cells). Other examples of determining alternative serving cells for mobile devices may be used. For example, the location reported by or determined for mobile devices may be used to determine whether the mobile devices are in the coverage area of one or more cells.

Figure 3:
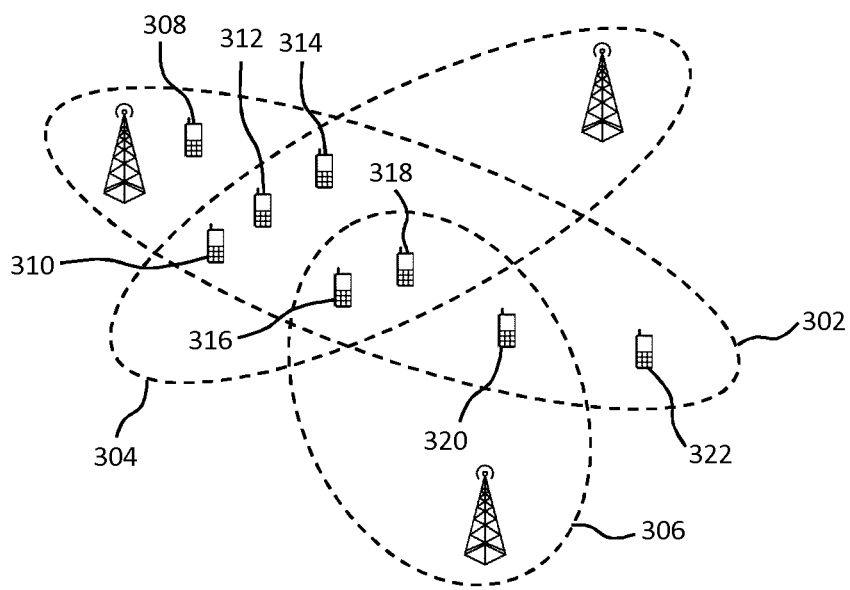
FIG. 3 is a schematic illustration of an example of a part of a communications network.

FIG. 3 shows an example of a part of a network 300 including three cells 302, 304 and 306. The first cell 302 may have mobile devices 308, 310, 312, 314, 316, 318, 320 and 322 within its coverage area (e.g. the signal strength is sufficient within the coverage area for devices within that coverage area to be served by the cell) and be the serving cell for those devices. The second cell 304 has mobile devices 310, 312, 314, 316 and 318 within its coverage area. The third cell 306 has mobile devices 316, 318 and 320 within its coverage area.

Table 1 below shows an example of measurement reports from each of the mobile devices 308-322 at a particular point in time that indicate RSRP at each device from the cells 302, 304 and 306.

TABLE 1

| Mobile device | RSRP, dBm | | | PTL value |
| --- | --- | --- | --- | --- |
| | Serving cell 302 | Cell 304 | Cell 306 | |
| 308 | −70 | <min | <min | 1 |
| 310 | −80 | −100 | <min | 0 |
| 312 | −80 | −95 | <min | 0 |
| 314 | −80 | −90 | <min | 0 |
| 316 | −90 | −95 | −95 | 0 |
| 318 | −90 | −90 | −95 | 0 |
| 320 | −100 | <min | −80 | 0 |
| 322 | −110 | <min | <min | 1 |

In Table 1, "<min" indicates that the RSRP for a cell is below the minimum value for the cell to be considered as a suitable serving cell. It can be seen, therefore, that for example mobile device 308 has no suitable alternative serving cell, whereas mobile device 316 has two suitable alternative serving cells, being cells 304 and 306. The PTL value (potential traffic loss) is a value for each of the devices 308-322 that indicates potential traffic loss in the event that the serving cell experiences an outage. A "1" indicates that the device will experience a traffic loss, i.e. there is no suitable alternative serving cell for that device. On the other hand, a "0" for PTL indicates that there is at least one suitable serving cell for that device, and in the event that the serving cell experiences an outage the device may be able to use the alternative cell as its serving cell. In this example, a RSRP of −120 dBm is considered as the minimum RSRP for a suitable serving cell, though in other examples a different value may be selected, or the value may be variable. Although the potential traffic loss (PTL) value is generated based on reports from mobile devices, other examples may generate the PTL value in other ways.

Table 1 shows measurements for all three cells as reported by all of the devices. However, each device may be unaware of one or more neighbour cells (e.g. the signal strength is too low) and hence may not report measurements for those cells. In this case, it may be assumed that the RSRP, for example, of the neighbour cells that are unreported is below the minimum threshold. Additionally or alternatively, there may be more or fewer measurement reports from more or fewer devices, and there may be a different number of cells; eight devices and three cells are used merely as an illustrative example.

Historical data representing the potential impact of a cell outage at particular times during a period of time may be generated and stored for one or more cells in a communications network. That is, for example, the historical data may indicate the changing potential impact of a cell outage over a past period of time. The historical data may be stored for each cell of one or more cells in a communications network. In one example, the historical data may comprise the total potential traffic loss (PTL) value at a plurality of points in time. In another example, the historical data may comprise the proportion of devices served by the cell that will experience traffic loss in the event of an outage of the cell. In another example, the historical data may comprise the number or proportion of reports from devices served by the cell that will experience traffic loss in the event of an outage of the cell.

In the above example in Table 1, there are eight devices that have provided measurement reports. Of these devices, two devices (devices 308 and 322) do not appear to have a suitable alternative serving cell. Therefore, the PTL value for these devices is 1, and the total PTL for the cell at the point in time at which the reports were generated or received (or, for example, the time at which the PTL values were determined, in other embodiments) is 2. Therefore, the historical data may represent a value of 2 at that point in time. Alternatively, the proportion of reports with a PTL value of 1 is 25%. Therefore, the historical data may represent a value of 25% at that point in time. As such, in these examples, a higher value for the historical data at a point in time indicates a higher predicted severity, impact or significance if there was a cell outage at that particular time.

In some embodiments, a value indicating the potential traffic loss for a device served by a cell may be weighted depending on one or more criteria. For example, a weight for a device may be based on one or more of a geographic location the device, a user type of the device, a usage type for the device, a device type of the device, a network slice used by the device, or any other criteria.

For example, users in certain geographical areas may be given a higher weight than other areas. Users of a certain type (for example, those that subscribe to a premium service, or emergency services) may be given a higher weight. Certain device usages may also be given a higher weight. For example, users of voice calls may be given a higher weight than users of data as data users may be able to transmit or receive data in other ways, such as over a Wi-Fi network. Certain network slices may also be given a higher weight. For example, a slice used by emergency services may be given a higher weight than a slice used by normal users, who may in turn be given a higher weight than a slice used by Internet of Things (IoT) devices, smart utility meters and the like.

Table 2 below shows an example of weights given to certain geographical areas within a cell and certain subscriber categories of devices served by the cell.

TABLE 2

| UE No | Subscriber Category Weight | Area Importance Weight | PTL | WPTL |
| --- | --- | --- | --- | --- |
| 308 | 1.5 | 2 | 1 | 3 |
| 310 | 1 | 1 | 0 | 0 |
| 312 | 1.5 | 1 | 0 | 0 |
| 314 | 1 | 2 | 0 | 0 |
| 316 | 1.5 | 1 | 0 | 0 |
| 318 | 1 | 1 | 0 | 0 |
| 320 | 1 | 1 | 1 | 1 |
| 322 | 1 | 2 | 1 | 2 |

Each device is given an area importance weight of 1, except for devices 308, 314 and 322, which are given an area importance weight of 2 due to their geographic location (which may be reported by each device, estimated from signals received from the devices or determined in any other suitable manner). Also, each device is given a subscriber category weight of 1 except for devices 308, 312 and 316, which are given a subscriber weight of 1.5 due to the user type of those devices. The PTL value from table 1 is shown. In this example, the PTL value is multiplied by each weight to give a weighted PTL (WPTL) value. In the example shown in FIG. 2, the total PTL value for the cell at the time when the device reports were generated or received (or, for example, the time at which the PTL values were determined, in other embodiments) is 2, whereas the total WPTL value is 6. The historical data for the cell may be based on the WPTL value. Alternatively, for example, the historical data may be based on the proportion of total WPTL value to maximum total WPTL value (i.e. the WPTL value if all PTL values are 1).

Figure 4:
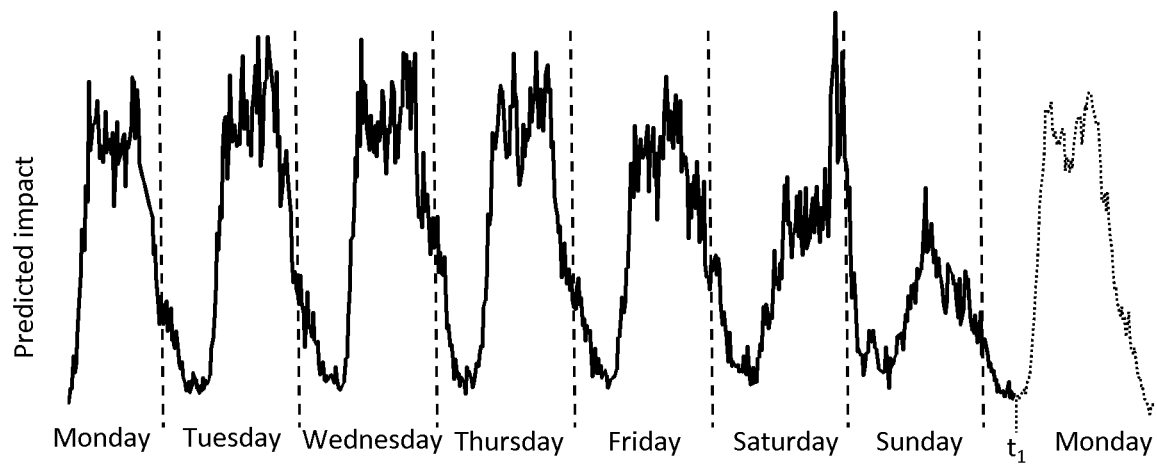
FIG. 4 is a graph of an example of predicted impact of an outage against time for a cell.

FIG. 4 shows an example of a graph 400 of predicted impact (for example, total PTL value, total WPTL value, proportion of devices that would experience traffic loss, proportion of total WPTL value to maximum total WPTL value, or any other suitable value) of an outage against time for a cell. The time period shown in FIG. 4 is separated into days. The predicted impact of an outage of the cell is shown as a solid line up to time $t_1$, and may be based on measured or received data, such as for example measurement reports from devices served by the cell. It can be seen that the predicted impact is generally periodic across the days in this example. At time $t_1$, a cell outage is detected. At this point, a time-variable parameter may be determined for a first time period following time $t_1$, the time-variable parameter being indicative of a predicted impact of the outage of the cell based on the historical data (e.g. the predicted impact before time $t_1$). It should be noted that the potential impact of a cell outage can be predicted even in the absence of any outages of the cell during the time period over which the historical data is considered. The time-variable parameter is shown in FIG. 4 as a dashed line, as it is based on historical data, instead of the predicted impact before time $t_1$ which is based on measured or received data at the particular point in time, such as device measurement reports and the like.

In some examples, the time-variable parameter is determined using the same process used to determine the historical data, but based on predicted information instead of measured or received information. For example, the predicted impact at times before time $t_1$ may be based on measurement reports produced or received at those times, and may be for example a total PTL at those times. The time-variable parameter may comprise a predicted total PTL, based on historical PTL values.

In some examples, the time-variable parameter for the first time period (e.g. following time $t_1$) is determined based on one or more earlier time periods. In one simple example, the earlier time period may be a corresponding time period such as the same day in the previous week. So, the time variable parameter following time $t_1$ in FIG. 4, which occurs on a Monday, may be the same as the predicted impact for the previous Monday. In other examples, the time-variable parameter is based on a plurality of earlier time periods. For instance, the time-variable parameter may comprise an average of a predicted impact over a plurality of time periods, such as a plurality of earlier days, a plurality of earlier corresponding time periods (e.g. a plurality of earlier Mondays) or the like. Other examples may employ more advanced processing to predict the time-variable parameter by predicting the data on which the time-variable parameter is based. For instance, a number or proportion of devices expected to have no suitable alternative serving cell during the first time period may be predicted, and therefore PTL values, WPTL values or any other suitable values may be predicted based on this predicted information. In other examples, machine learning, artificial intelligence, an autoregressive integrated moving average (ARIMA) model, or any other approach may be used to predict the impact of cell outage, determine the time-variable parameter, or determine the data on which the time-variable parameter is based.

Figure 5:
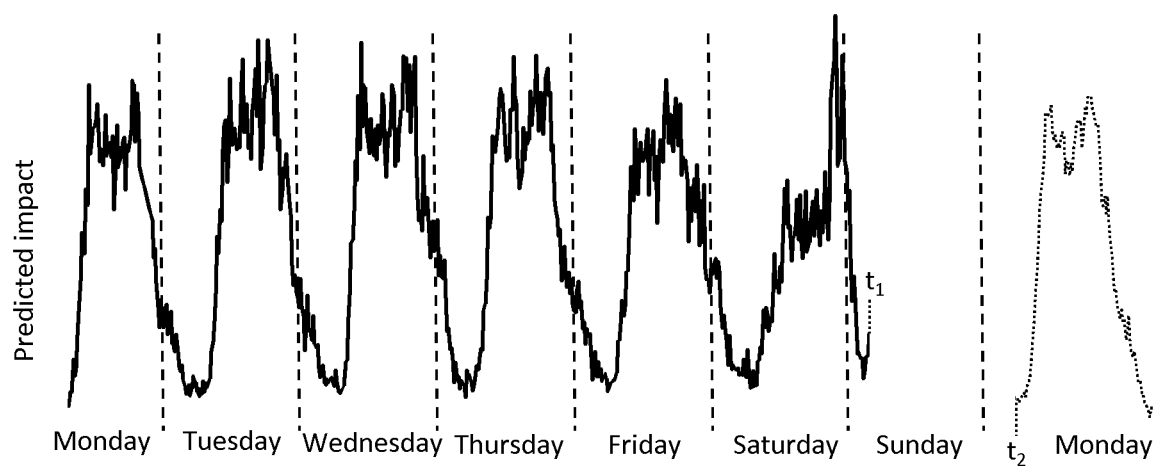
FIG. 5 is a graph of another example of predicted impact of an outage against time for a cell.

FIG. 5 shows an example of a graph 500 of predicted impact of an outage against time for a cell. Predicted impact is shown up to time $t_1$, which may be the present time or a most recent determination of predicted impact (e.g. the latest time when measurement reports were received from devices served by the cell, which were then used to determine the predicted impact). However, an outage for the cell may be predicted starting at a future time $t_2$. The time-variable parameter may be determined beginning from time $t_2$, as shown in FIG. 5 by the gap in predicted impact between times $t_1$ and $t_2$. Hence embodiments as disclosed herein may operate with detected, current outages as well as predicted future outages. In other embodiments, the time variable parameter indicative of the predicted impact may be calculated for the times between $t_1$ and $t_2$.

The time-variable parameter may be used to perform one or more actions in relation to the outage. In one example, the time-variable parameter is compared to a threshold value. If the time-variable parameter is predicted to exceed a first threshold during the first time period, then actions may be taken to compensate for the outage. For example, neighbouring cells may be reconfigured to adjust their coverage area so that at least part of the coverage area of the cell in outage is covered instead by the coverage area of one or more neighbouring cells. The actions to compensate for the outage may be taken immediately, when the outage is expected to start (e.g. time $t_2$ as shown in FIG. 2) for predicted future outages, or at a time when the time-variable parameter is expected to exceed the first threshold. Similarly, actions may be taken to reverse these actions, for example when the outage is resolved, or when the time-variable parameter falls below a second threshold, which may or may not be the same as the first threshold. If the time-variable parameter is not expected to exceed the first threshold, then the one or more actions to be performed in relation to the outage may comprise taking no action to compensate for the outage. In this way, for example, actions may only be taken if they are deemed necessary, i.e. the predicted impact of an outage is deemed sufficiently serious for action to be taken, and action may be postponed until the time when the impact is predicted to become sufficiently large. As actions such as reconfiguring neighbour cells may have a detrimental effect on the reconfigured cells or the devices served by those cells, postponing the reconfiguration actions may have benefits for those cells by not reconfiguring those cells at times when the reconfiguration is deemed not necessary.

In some cases, multiple cells may experience an outage simultaneously. In such cases, the time-variable parameter may indicate the predicted impact of the outage of multiple cells. An example of this scenario is illustrated below with reference to Table 3.

TABLE 3

| Mobile device | RSRP, dBm | | | PTL value | EPTL value |
| --- | --- | --- | --- | --- | --- |
| | Serving cell 302 | Cell 304 | Cell 306 | | |
| 308 | −70 | <min | <min | 1 | 1 |
| 310 | −80 | −100 | <min | 0 | 1 |
| 312 | −80 | −95 | <min | 0 | 1 |
| 314 | −80 | −90 | <min | 0 | 1 |
| 316 | −90 | −95 | −95 | 0 | 0 |
| 318 | −90 | −90 | −95 | 0 | 0 |

TABLE 3-continued

| | | RSRP, dBm | | | |
|---|---|---|---|---|---|
| Mobile device | Serving cell 302 | Cell 304 | Cell 306 | PTL value | EPTL value |
| 320 | −100 | <min | −80 | 0 | 0 |
| 322 | −110 | <min | <min | 1 | 1 |

Table 3 is identical to Table 1, except that Table 3 includes an extended potential traffic loss (EPTL) value indicating the potential traffic loss if both cells 302 and 304 experience an outage. It can be seen from Table 3 that the total EPTL value is 5, or 62.5% of the devices that are featured in the table (e.g. have sent measurement reports) would experience traffic loss (i.e. lack of suitable alternative serving cell) if both cells 302 and 304 simultaneously experienced an outage. Some embodiments disclosed herein may determine the predicted impact of multiple cell outages based on historical data, which itself may comprise or be based on such measurement reports or other data indicating a number or proportion of devices that may experience traffic loss if multiple cells experience an outage. The time-variable parameter may be determined such that it is indicative of the predicted impact of multiple cell outages and may be used to determine whether to take compensation actions (e.g. whether the time-variable parameter rises above a threshold, for example) and/or the time at which to take actions. The total EPTL value represents the severity of outage of cell 302, though the EPTL value is higher than the PTL value as there are fewer options for affected devices to use neighbour cells. The total EPTL may be even higher if other cells are also experiencing an outage.

In some examples, the time-variable parameter may consider loading of neighbour cells. For example, neighbour cells that are experiencing high load are not considered as suitable alternative serving cells. In one illustrative example, the time-variable parameter may be based on historical data, for example measurement reports from mobile devices, but may process the historical data as if the neighbour cell under high load was not present or as if all of the measurement reports indicated that the neighbour cell under high load was not a suitable alternative serving cell. In these circumstances, it is possible that a higher predicted impact of cell outage would result, as devices affected by cell outage may not be able to use the neighbour cell under high load instead. In these examples, where one or more neighbour cells are experiencing high loads, a value for a cell such as the total EPTL value for the cell discussed above may be generated.

Other examples may use data pertaining to multiple cells that are experiencing or are predicted to experience an outage to determine an order in which to take certain actions. For example, if two cells experience an outage, it may be advantageous to take actions to resolve the outage (such as repair the cause of the outage) of one cell before the other cell, particularly if the repair actions are sequential and cannot be performed simultaneously. One example of this scenario is where an engineer must travel to the site of a base station associated with each cell and perform repair actions before travelling to the site of another cell in outage.

As such, the total time-variable parameter for a cell (e.g. the area under the time-variable parameter graph between the time the outage starts and the time of completion of a repair action for that cell) may be taken into account when determining the order of actions to be taken. In particular, for example, the order of resolution actions may be chosen such that the total time-variable parameter for multiple cells is lower or minimized. This may be done for two or more simultaneous cell outages. The method in this embodiment may comprise detecting or predicting an outage of at least one additional cell during the first time period. In this embodiment performing one or more actions in relation to the outage comprises determining an order of sequential outage resolution actions for the cell and the at least one additional cell that provides a minimum total predicted impact of the outage of the cell and predicted impact of the outage of the at least one additional cell. Therefore, the total predicted impact (e.g. total predicted time-variable parameter across all cells in outage from the start of the outage to the resolution of each of the outages) can be reduced or minimized by choosing the order of resolution actions for each cell.

In one example, where there are a plurality of simultaneous cell outages, all possible orders of resolution actions can be considered in turn, each resolution action being for resolution of the outage of a respective cell. For each order of resolution actions, an estimated completion time may be determined, 802, for each of the outage resolution actions. This may comprise a time between the start of the outage and completion of the resolution action for the respective cell. This will provide, for the cell, a total predicted impact (e.g. total time-variable parameter) for the time that particular cell would experience an outage. The time for completion of the resolution action may be estimated and may also be based on the completion time or estimated completion time of a preceding resolution action, for example where the resolution actions must be performed sequentially. Preferably, method comprises determining, 804, for each of the outage resolution actions, a further time-variable parameter. This further time-variable parameter is indicative of predicted measure of the impact of the outage of the associated cell or at least one additional cell between the start of the first time period and the estimated completion time for the resolution action for the cell or the at least one additional cell. Further in this embodiment the total of the total time-variable parameters across all the cells can then be calculated, 806. If a plurality of different orders for the resolution actions is processed in this way, the order that gives a lower or the minimum total can be selected, 808.

Figure 6:
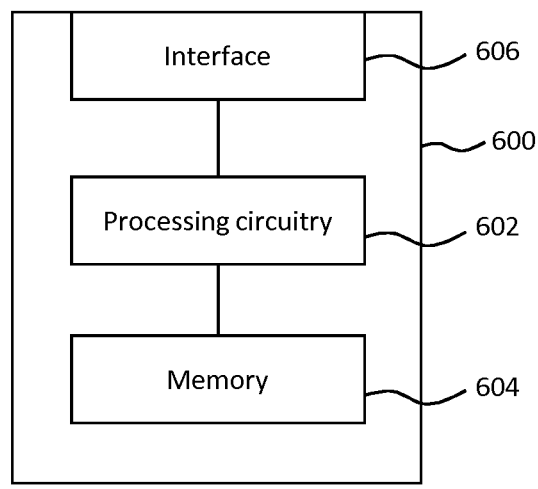
FIG. 6 is schematic illustration of an example of an apparatus for optimizing cell outage mitigation.
Figure 8:
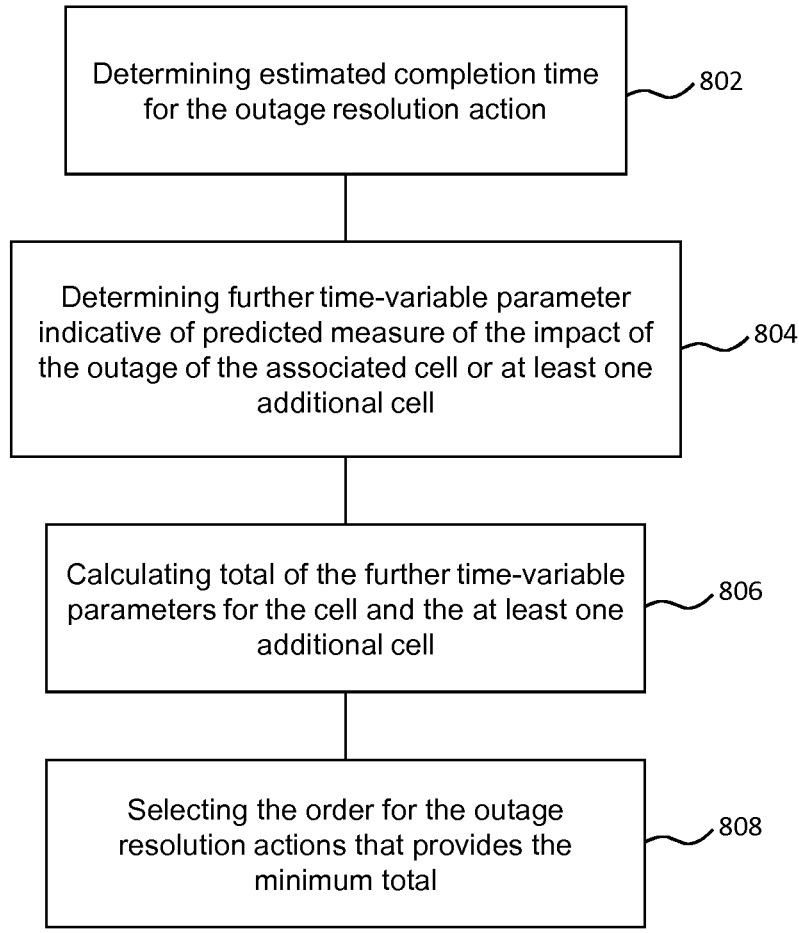
FIG. 8 is a flow chart of an example of an embodiment of the method for determining an order of sequential outage resolution actions.

FIG. 6 shows an example of apparatus 600 according to embodiments of the disclosure. The apparatus 600 may be an apparatus for optimising mitigation of an outage of a cell in a communications network. The apparatus 600 may be configured to perform the method of FIG. 2 and FIG. 8 in its various embodiments described earlier.

The apparatus 600 comprises processing circuitry 602 (e.g. a processor) and a memory 604 in communication with the processing circuitry 602. The memory 604 contains instructions executable by the processor 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 containing instructions executable by the processor 602 such that the apparatus is operable to is operable to: determine an outage of the cell during a first time period; determine a time-variable parameter indicative of predicted impact of the outage of the cell, the impact being predicted based on historical data for the cell in at least one earlier time period; and perform one or more actions in relation to the outage based on the time-variable parameter for said first time period.

Figure 7:
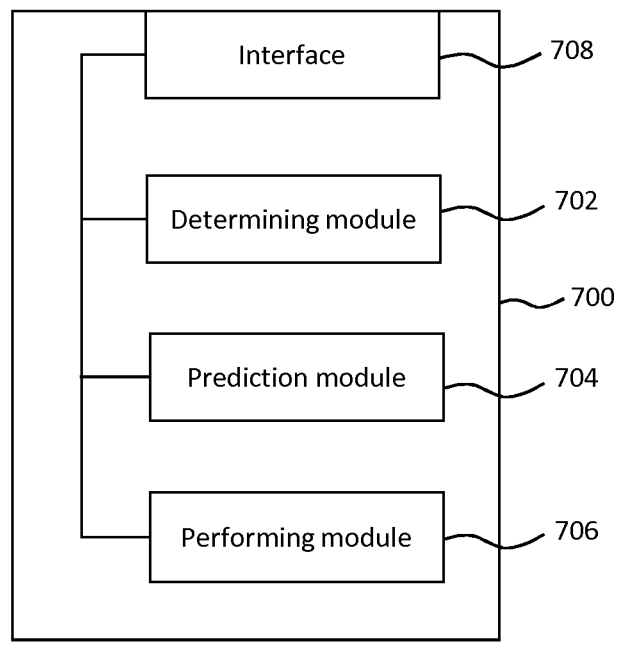
FIG. 7 is a schematic illustration of another example of an apparatus for optimizing cell outage mitigation.

FIG. 7 shows an example of an apparatus 700 for optimising mitigation of an outage of a cell in a communications network. The apparatus comprises a determining module 702 for determining an outage of the cell during a first time period, and a prediction module 704 for determining a time-variable parameter indicative of predicted impact of the outage of the cell, the impact being predicted based on historical data for the cell in at least one earlier time period. The apparatus 700 also comprises a performing module 706 for performing one or more actions in relation to the outage based on the time-variable parameter for said first time period. The apparatus 700 also comprises an interface 708. Although the interface 707, determining module 702, prediction module 704 and performing module 706 are shown connected to a bus, these may alternatively be interconnected in any other way, for example in series.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of optimising mitigation of an outage of a cell in a communications network, the method comprising:
   determining the outage of the cell during a first time period;
   determining a time-variable parameter indicative of predicted impact of the outage of the cell, the impact being predicted based on historical data for the cell in at least one earlier time period; and
   performing one or more actions in relation to the outage based on the time-variable parameter for said first time period,
   wherein the historical data is based at least in part on a number or proportion of reports from devices served by the cell in the at least one earlier time period that indicate no one suitable alternative serving cell.

2. The method of claim 1, wherein determining the outage of the cell comprises detecting a current outage of the cell or predicting a future outage of the cell.

3. The method of claim 1, wherein the historical data is weighted for each of the devices served by the cell in the at least one earlier time period based on one or more criteria.

4. The method of claim 1, wherein the time-variable parameter is based at least in part on a number or proportion of devices predicted to be served by the cell in the first time period that have no suitable alternative serving cell.

5. The method of claim 4, wherein the time-variable parameter is weighted for each of the devices that are predicted to be served by the cell in the first time period based on one or more criteria.

6. The method of claim 3, wherein the one or more criteria comprise at least one of a geographic location of each of the devices, a user type of each of the devices, a usage type for each of the devices, a device type of each of the devices and a network slice used by each of the devices.

7. The method of claim 1, wherein the at least one earlier time period corresponds to a same time of day as the first time period on at least one earlier day.

8. The method of claim 1, wherein performing the one or more actions in relation to the outage comprises:
   carrying out steps to compensate for the outage of the cell when the time-variable parameter is predicted to exceed a first threshold; and
   taking no action to compensate for the outage of the cell when the time-variable parameter is not predicted to exceed the first threshold.

9. The method of claim 1, wherein performing the one or more actions in relation to the outage comprises reconfiguring at least one neighbour cell of the cell to provide service to at least part of a coverage area of the cell.

10. The method of claim 1, further comprising detecting or predicting an outage of at least one additional cell during the first time period, and wherein performing one or more actions in relation to the outage comprises determining an order of sequential outage resolution actions for the cell and the at least one additional cell that provides a minimum total predicted impact of the outage of the cell and predicted impact of the outage of the at least one additional cell.

11. Apparatus for optimising mitigation of an outage of a cell in a communications network, the apparatus comprising a processor and a memory, the memory containing instructions executable by the processor such that the apparatus is configured to:
   determine the outage of the cell during a first time period;
   determine a time-variable parameter indicative of predicted impact of the outage of the cell, the impact being predicted based on historical data for the cell in at least one earlier time period; and
   perform one or more actions in relation to the outage based on the time-variable parameter for said first time period,
   wherein the historical data is based at least in part on a number or proportion of devices served by the cell in the at least one earlier time period that indicate no suitable alternative serving cell.

12. The apparatus of claim 11, wherein the memory contains instructions executable by the processor such that the apparatus is configured to determine the outage of the cell by detecting a current outage of the cell or predicting a future outage of the cell.

13. The apparatus of claim 11, wherein the predicted impact of the outage of the cell is based at least in part on a number or proportion of devices predicted to be served by the cell in the first time period that have no suitable alternative serving cell.

14. The apparatus of claim 11, wherein potential serving cells that have an outage during the first time period are not considered as suitable alternative serving cells.

15. The apparatus of claim 11, wherein the at least one earlier time period corresponds to a same time of day as the first time period on at least one earlier day.

16. The apparatus of claim 11, wherein the impact is predicted based on an average of the historical data across a plurality of earlier days.

17. The apparatus of claim 11, wherein the memory contains instructions executable by the processor such that the apparatus is configured to perform the one or more actions in relation to the outage by:

carrying out steps to compensate for the outage of the cell when the time-variable parameter is predicted to exceed a first threshold; and taking no action to compensate for the outage of the cell when the time-variable parameter is not predicted to exceed the first threshold.

18. The apparatus of claim 17, wherein the memory contains instructions executable by the processor such that the apparatus is configured, when the time-variable parameter is predicted to exceed the first threshold, to carry out the steps to compensate for the outage by carrying out the steps at a time when the time-variable parameter is predicted to exceed the first threshold.

* * * * *